United States Patent
Hirokawa et al.

(10) Patent No.: US 8,482,814 B2
(45) Date of Patent: Jul. 9, 2013

(54) TRAVELING UNIT DRIVING APPARATUS AND IMAGE READING APPARATUS PROVIDED WITH THE DRIVING APPARATUS

(75) Inventors: Hiroyuki Hirokawa, Minamikoma-gun (JP); Shinnosuke Enomoto, Minamikoma-gun (JP); Mamoru Dohi, Minamikoma-gun (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 380 days.

(21) Appl. No.: 12/923,040

(22) Filed: Aug. 31, 2010

(65) Prior Publication Data
US 2011/0051202 A1 Mar. 3, 2011

(30) Foreign Application Priority Data
Sep. 2, 2009 (JP) ................................. 2009-202771

(51) Int. Cl.
*H04N 1/04* (2006.01)
(52) U.S. Cl.
USPC ........... 358/474; 358/497; 358/496; 358/475; 399/367; 399/211
(58) Field of Classification Search
USPC ................. 358/474, 501, 418, 483, 482, 497, 358/296, 498; 399/367, 379, 380, 211; 254/266
See application file for complete search history.

(56) References Cited

U.S. PATENT DOCUMENTS

| | | | | |
|---|---|---|---|---|
| 3,652,793 A * | 3/1972 | Farr et al. | ...................... | 358/476 |
| 4,536,077 A * | 8/1985 | Stoffel | .......................... | 358/497 |
| 4,982,236 A * | 1/1991 | Bock | .............................. | 399/211 |
| 5,442,449 A * | 8/1995 | Stemmle et al. | .............. | 358/296 |
| 5,790,165 A * | 8/1998 | Kuboki et al. | ................. | 347/257 |
| 5,805,311 A * | 9/1998 | Phillips | .......................... | 358/500 |
| 5,875,376 A * | 2/1999 | Chou | ........................... | 399/211 |
| 6,055,070 A * | 4/2000 | Kang | ............................ | 358/497 |
| 6,178,013 B1 * | 1/2001 | Lin | ................................ | 358/474 |
| 6,519,047 B1 * | 2/2003 | Ahn | ............................. | 358/1.12 |
| 6,594,039 B1 * | 7/2003 | Kanbayashi | .................. | 358/491 |
| 7,567,366 B2 * | 7/2009 | Okamura | ...................... | 358/474 |
| 7,618,140 B2 * | 11/2009 | Kato | ............................. | 347/104 |
| 7,924,479 B2 * | 4/2011 | Nogami | ........................ | 358/488 |
| 8,253,986 B2 * | 8/2012 | Ikeno et al. | .................... | 358/461 |
| 2011/0157666 A1 * | 6/2011 | Hirokawa et al. | ............. | 358/498 |

FOREIGN PATENT DOCUMENTS

| | | |
|---|---|---|
| JP | H11-263509 | 9/1999 |
| JP | H11-286153 | 10/1999 |

* cited by examiner

*Primary Examiner* — Negussie Worku
(74) *Attorney, Agent, or Firm* — Manabu Kanesaka (57) ABSTRACT

Provided is a traveling unit driving apparatus where a driving belt of the traveling unit is manufactured with ease, and concurrently therewith, can be coupled reliably to the unit in a state with high durability.

A driving belt extended between a pair of pulleys is formed using a belt with ends and teeth, and a belt fixing means is comprised of a first and second engagement portions provided in the traveling unit, a concave recess portion disposed between the portions, and a lock fixing member that is fitted into the concave recess portion. Then, the first and second engagement portions and the concave recess portion are provided with a first and second mount surfaces for bending and supporting the belt opposite end portions, the lock fixing member is fitted into the concave recess portion, and the belt opposite end portions are thereby sandwiched and held in a bent state. Concurrently therewith, the first and second engagement portions and the lock fixing member are respectively provided with protrusions for engaging in the belt tooth surface.

10 Claims, 7 Drawing Sheets

TRAVELING UNIT DRIVING APPARATUS AND IMAGE READING APPARATUS PROVIDED WITH THE DRIVING APPARATUS

RELATED APPLICATIONS

The present application is based on, and claims priority from Japanese Application No. 2009-202771, filed Sep. 2, 2009, the disclosure of which is hereby incorporated by reference herein in its entirety.

BACKGROUND OF THE INVENTION

1. Technical Field

The present invention relates to improvements in a driving mechanism for causing a traveling unit to reciprocate in an apparatus provided with the traveling unit such as an image reading carriage that reciprocates with a predetermined stroke.

2. Description of the Related Art

Generally, in this type of image reading apparatus i.e. image reading apparatus such as a copier and scanner apparatus, in reading an original document image set on a platen, an optical carriage is mounted with a light source for emitting reading light, and an image reading sensor performs photoelectric conversion on the reflected light from the original document. Therefore, the optical carriage mounted with the light source and reflecting mirrors reciprocates along an image reading area of the platen to scan the original document image.

Therefore, the optical carriage has a frame inappropriate form mounted with a light source lamp and reflecting mirrors, and is configured as a unit, and the unit is supported on guide rails and is configured to be able to reciprocate. Then, thus configured traveling unit reciprocates at a predetermined velocity by a driving motor. As this driving mechanism, driving pulleys are disposed in opposite end portions of the platen, a driving member such as a belt and wire is wound over the pair of pulleys, and the driving member is coupled to the traveling unit supported on the guide rails.

Conventionally, as this driving member, a belt with teeth and wire have been used. Then, in the case of the wire, it is known there are problems such as a kink and position displacement of the winding pulley, and in the case of the belt with teeth, it is known there is a problem in manufacturing accuracy of the belt.

For example, it is proposed in Japanese Patent Application Publication No. H11-286153 that a pair of pulleys with teeth are arranged with an image reading area of the platen therebetween, a timing belt is wound between the pulleys, and on the traveling unit side is provided an engagement member having a concavo-convex surface adapted to the tooth surface of the timing belt.

Further, Japanese Patent Application Publication No. H11-263509 discloses a mechanism as a conveyor mechanism for conveying a sheet etc. in which a timing belt is extended between pulleys, and in fixing a carrier member for transporting a sheet to the belt, the tooth surface of the belt and protrusions on the carrier side are mated with each other and thereby coupled to each other.

As described above, in driving a traveling unit reciprocating with a predetermine stroke, it is widely adopted extending the wire or extending a belt with teeth between a pair of pulleys. However, in the case of the wire, when a position displacement arises in winding by a winding pulley, a winding amount changes and fluctuations in velocity occur in the traveling unit. Concurrently therewith, a kink tends to occur in the wire in winding, and it is known there is a problem in durability.

Meanwhile, when the belt with teeth such as a timing belt is used, it is known there is a problem in dimension accuracy in manufacturing the belt. Generally, the belt with teeth is manufactured by incorporating a core material into a base material such as rubber, and in this forming, the tooth forms are formed. Therefore, when the belt is coupled to the traveling unit simply by screw, through pin or the like, a coupling hole is broken (by the effect of the rubber base material), and it is difficult to fix with reliability and high durability.

Then, as proposed in Japanese Patent Application Publication No. H11-286153 as described previously, it is attempted to mate the tooth surface of the belt with teeth with the tooth surface provided in the fix portion on the traveling unit side. However, it is difficult to prepare the belt length and teeth pitch with precision in manufacturing the belt, and further, to adapt to a span between pulleys of the used traveling unit and a fix position on the traveling unit side, it is necessary to prepare the manufacturing die to adapt to the use conditions.

Therefore, conventionally, this type of driving belt has been manufactured in endless belt form by preparing a manufacturing die adapted to the use conditions. Accordingly, for example, in producing many types of image forming apparatuses in low volume, there is a problem that it is necessary to manufacture driving belts of many specifications. Meanwhile, it is naturally considered that this type of belt with teeth is formed of a belt (open belt) with ends and that the belt end portions are fixed to the traveling unit, but a problem still remains in a method of fixing the belt end portions.

Then, the inventor of the invention attempted to form the driving belt of the traveling unit using a belt (open belt) with ends, and reliably fix the belt end portions in a state with high durability. Then, the inventor arrived at an idea of adjusting the length with respect to the tooth surface of the belt, bending the belt end portions mating with the tooth surface in an orthogonal direction to fix, and thereby enabling the problems such as looseness and breakage (fix portion breakage) to be solved.

It is an object of the invention to provide a traveling unit driving apparatus where a driving belt is manufactured with ease in the case that a traveling unit reciprocates by the driving belt, and concurrently therewith, can be coupled reliably to the unit in a state with high durability.

BRIEF SUMMARY OF THE INVENTION

To attain the aforementioned object, in the invention, a driving belt extended between a pair of pulleys is formed using a belt with ends and teeth, and a belt fixing means is comprised of a first and second engagement portions provided in a traveling unit, a concave recess portion disposed between the portions, and a lock fixing member that is fitted into the concave recess portion. Then, the first and second engagement portions and the concave recess portion are provided with a first and second mount surfaces for bending and supporting the belt opposite end portions, the lock fixing member is fitted into the concave recess portion, and the belt opposite end portions are thereby sandwiched and held in a bent state. Concurrently therewith, the first and second engagement portions and the lock fixing member are respectively provided with protrusions for engaging in the belt tooth surface, and the invention is characterized by this means.

The configuration will specifically be described below. Provided are a traveling unit (6) supported on an apparatus frame (5) to be able to reciprocate, a driving belt (18) for causing the traveling unit to reciprocate with a predetermined stroke, a pair of pulleys (16a, 16b) for supporting the driving belt along a traveling direction of the traveling unit, a driving means for driving one of the pair of pulleys to rotate, and a belt fixing means (20) for locking the driving belt in the traveling unit.

Then, the driving belt is comprised of a belt with ends and teeth having opposite end edges, and the belt fixing means is comprised of a first engagement portion (21a) and a second engagement portion (21b) provided in the traveling unit, a concave recess portion (23) formed between the first engagement portion and the second engagement portion, and a lock fixing member that is fitted into the concave recess portion.

Further, the first engagement portion and the concave recess portion are provided with a first mount surface (22a) for bending and supporting one end edge portion of the belt with teeth, and the second engagement portion and the concave recess portion are provided with a second mount surface (22b) for bending and supporting the other end edge portion of the belt with teeth. Concurrently therewith, the lock fixing member is configured to be fitted into the concave recess portion so as to sandwich and hold one end portion of the belt with teeth with the first mount surface, and further sandwich and hold the other end portion with the second mount surface with each end portion bent, and protrusions for engaging in the tooth surface of the belt with teeth are formed respectively in the first engagement portion, second engagement portion and lock fixing member.

ADVANTAGEOUS EFFECT OF THE INVENTION

The advantageous effects of the invention will be described. In the invention, the driving belt extended between a pair of pulleys is formed of the belt with ends and teeth, and it is thereby possible to mass-produce the belt as an open belt with the belt length provided irrespective of apparatus specifications of a used traveling unit. Therefore, it is not necessary to prepare manufacturing equipment such as a manufacturing die corresponding to apparatus specifications, the belt can be cut into the length corresponding to the apparatus specifications and used, and it is possible to remarkably reduce the manufacturing cost.

Further, the structure for fixing the belt with teeth to the traveling unit is the mechanism for adjusting the length with the belt tooth surface of the belt end portions engaged in protrusions provided in the first and second engagement portions, and locking the protrusions of the lock fixing member in the belt tooth surface with the end portions bent substantially in the orthogonal direction, the fixing operation is thereby ease, and concurrently therewith, skills are not required to adjust the belt length and adjust the tension.

Particularly, since the belt end portions mated with the engagement portions are bent along the mount surfaces having substantially orthogonal corner portions, and are pressed by the lock fixing member, and concurrently therewith, the protrusions on the lock fixing member side are locked in the belt tooth surface, the belt end portions are acted upon by the locking force of the protrusions of the engagement portions, the locking force of the bent portions, and the locking force of the protrusions of the lock fixing member with each force thus dispersed, and does not undergo local breakage that would be caused by being acted upon by local stress (for example, as compared with conventional one-point fixing). Accordingly, the invention produces the outstanding effects of high durability and no fear of looseness in the use process.

BRIEF DESCRIPTION OF THE SEVERAL VIEWS OF THE DRAWINGS

FIG. 5 contains assembly state explanatory views with the driving belt of the FIG. 4 positioned in the carriage, where

FIG. 6 contains explanatory views of an assembly state with the driving belt fixed to the carriage, where FIG. 7 shows the structure of a lock fixing member in the coupling mechanism of FIG. 4, where

DETAILED DESCRIPTION OF THE INVENTION

[Configuration of an Optical Carriage]

Figure 1:
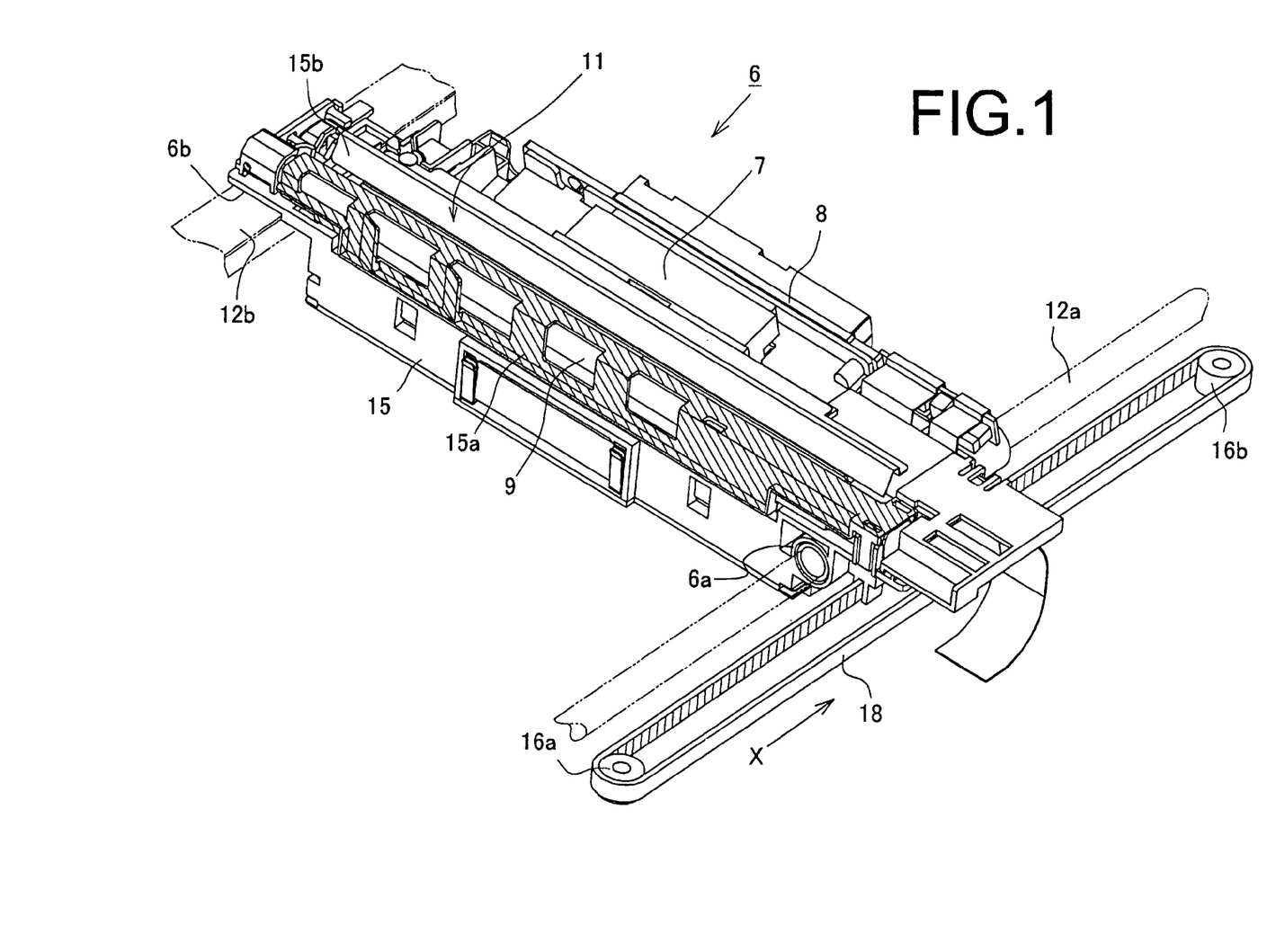
FIG. 1 is a perspective explanatory view showing an entire configuration of an optical carriage of an image reading apparatus.
Figure 2:
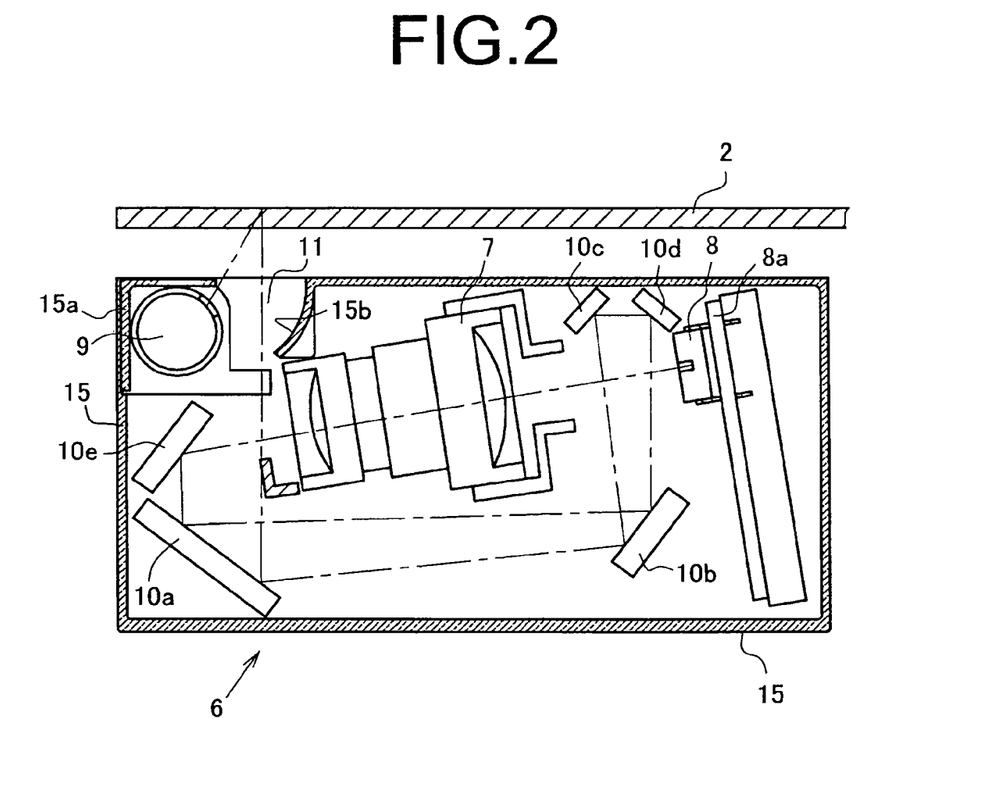
FIG. 2 is an explanatory view of an internal structure of the optical carriage of FIG. 1.
Figure 3:
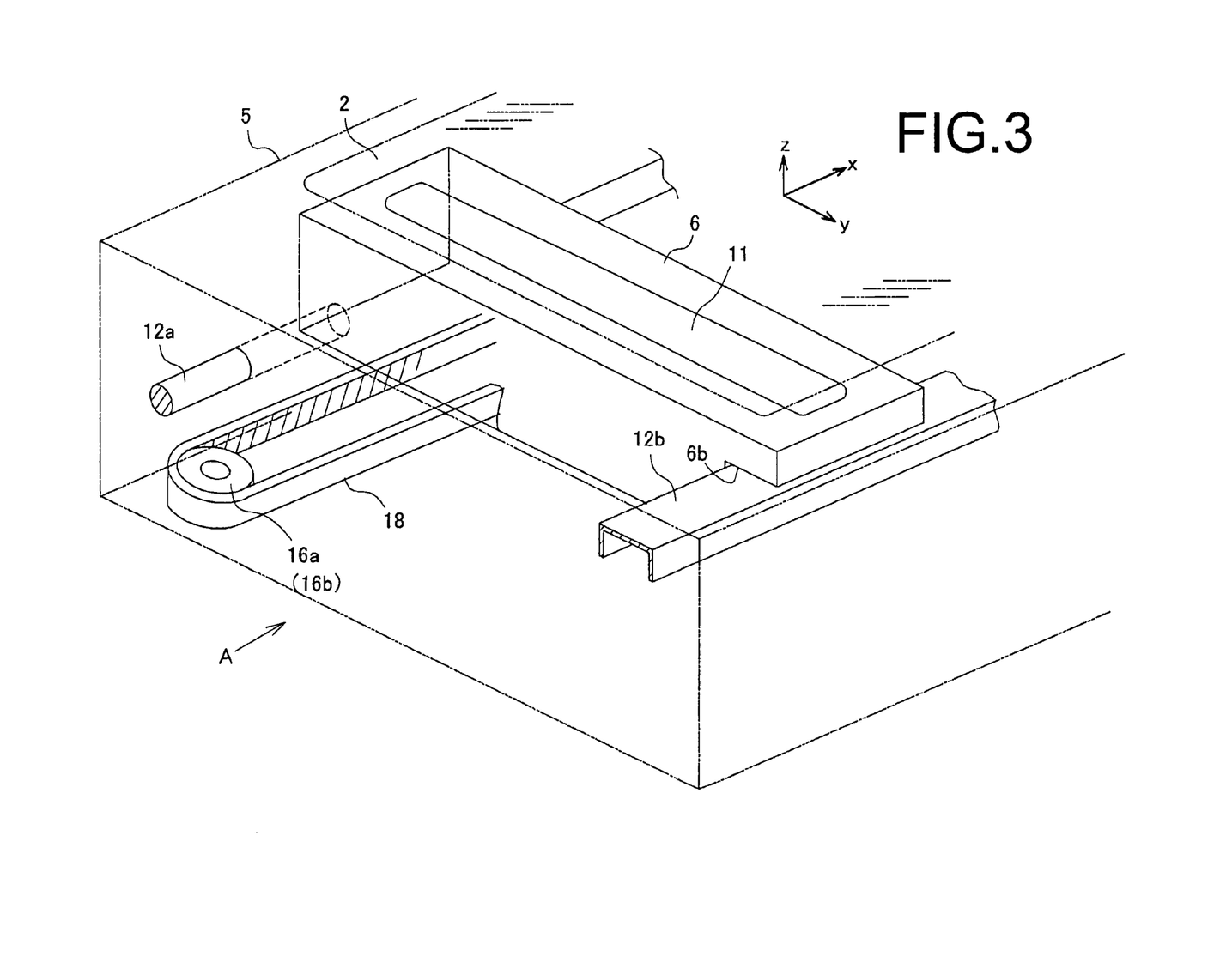
FIG. 3 is a perspective explanatory view showing the relationship between the optical carriage of FIG. 1 and platen.

FIG. 1 is an explanatory view of the entire configuration of an image reading apparatus provided with a driving apparatus for a traveling unit such an optical carriage. FIG. 2 is a structure explanatory view of the inside of the optical carriage, and FIG. 3 is a perspective explanatory view showing the relationship between the platen and optical carriage. Described below are a traveling unit structure and driving belt structure in this order.

[Carriage (Traveling Unit) Structure]

Described first is a configuration of the traveling unit (hereinafter, referred to as an optical carriage) according to the invention. As shown in FIG. 1, an optical carriage 6 is comprised of a carriage frame 15, light source 19, reflecting mirrors 10, condenser lens 7, and image reading sensor 8. The carriage frame 15 is formed of, for example, a resin high in heat resistance, and mounted with the light source lamp 9, imaging devices (reflecting mirrors and condenser lens), and image reading sensor 8.

In the carriage frame 15 is formed a reading opening 11 corresponding to a reading width of an original document sheet, light is emitted to the original document sheet through the reading opening 11, and the reflected light is applied onto the image reading sensor 8 by the imaging devices. Then, the carriage frame 15 is provided with engagement portions 6a, 6b engaging in a first and second rail members 12a, 12b prepared in a scanner unit A. In the apparatus shown in the figure, the first and second rail members are comprised of a guide rod 12a and guide rail 12b, and disposed as a pair to the left and right of a platen 2 described later, and the carriage frame 15 is provided with a bearing engagement portion 6a with which the guide rod 12a is fitted, and a slide engagement portion 6b engaging in the guide rail 12b.

As shown in FIG. 2, the light source lamp 9 is comprised of a light source lamp for emitting linear light along the reading opening 11 of the carriage frame 15. "15a" shown in the figure denotes a heat resistant lamp cover, and "15b" shown in the figure denotes a reflecting plate. The light source 9 adopts a reflection structure for emitting light of a rod-shaped light-emitting body such as a fluorescent lamp and a xenon lamp or of point-like light-emitting device as linear light. Thus configured light source 9 is integrally attached to the carriage frame 15, and emits reading light to an original document sheet on the platen 2, described later, through the reading opening 11.

The reflecting mirrors 10 are comprised of a plurality of mirrors as appropriate to form an optical path length with a predetermined length. In the mirrors shown in the figure, a first mirror 10a reflects the reflected light of the original document image toward a second mirror 10b, the light is guided to a third mirror 10c, and then a fourth mirror 10d, and the light from the fourth mirror 10d is guided to the second mirror 10b, then the first mirror 10a, and to the condenser lens 7 by a fifth mirror 10e. In addition, the reflected light of the original document image is not limited to such optical path formation, and for example, it is possible to form an optical path by two, first and second, mirrors.

The condenser lens 7 is comprised of a single or plurality of imaging lenses, and applies the reflected light of the original document image sent from the reflecting mirror 10 onto the image reading sensor 8 for image formation. Further, the image reading sensor 8 is comprised of a photoelectric conversion sensor such as CCD, and performs photoelectric conversion on the reflected light of the original document image sent from the condenser lens 7. Particularly, the image reading sensor 8 shown in the figure is comprised of a color line sensor, where sensor devices respectively constituting pixels of R (Red), G (Green) and B (Blue) are arranged in three lines. The image reading sensor 8 with such a configuration is attached to a substrate 8a, and the substrate 8a is fixed to the carriage frame 15.

[Driving Mechanism of the Traveling Unit]

The optical carriage (traveling unit: the same in the following) as described previously is supported by the first and second rail members 12a, 12b and is configured to reciprocate along the platen 2. Then, on the apparatus frame 5 side, a pair of pulleys 16a, 16b are disposed opposite the opposite sides of the image reading area of the platen 2.

In the pulleys as shown in the figure, the pulleys 16a, 16b are disposed in a chassis provided in the bottom portion of the apparatus frame 5 to be paired and opposite each other at the left and right. In the pulleys 16a, 16b, a tooth surface, not shown, is formed on the periphery, and the teeth pitch is formed at intervals to be fitted into tooth forms 18a of a driving belt 18 described later. Then, one of the pulleys is coupled to a driving motor not shown, and the motor is comprised of a reversible motor capable of rotating forward and backward.

The driving belt 18 is looped between the pair of pulleys as described below. The invention is characterized in that the driving belt 18 is comprised of a belt with ends and teeth. In other words, the belt 18 is an open belt form with opposite end portions cut, and tooth forms 18a are formed on the inner surface of the belt at a predetermined pitch. Accordingly, when the belt is looped with the tooth forms 18a mated with the tooth surfaces of the pulleys 16a, 16b, the belt shifts by a precise displacement amount (without slip) corresponding to the rotation angle of the pulleys 16a, 16b. Such a belt with teeth is known as a timing belt, and for example, is obtained by blending fibers, glass fibers and the like for reinforcement into rubber or rubber material as a main material, and curing and forming the material inside a manufacturing die with tooth forms formed.

Figure 4:
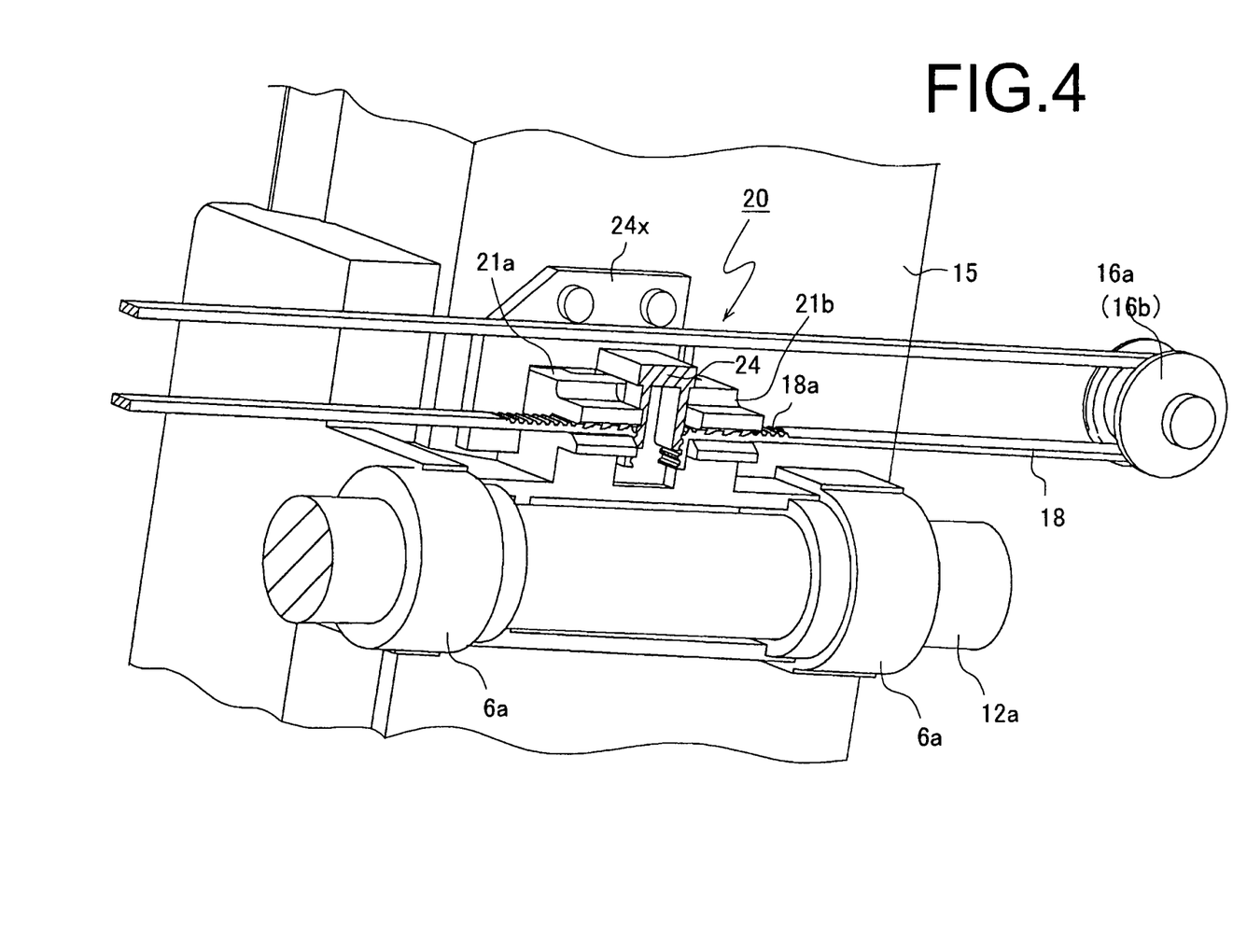
FIG. 4 is a perspective explanatory view showing a coupling mechanism for the optical carriage and driving belt.

Thus formed belt material is cut in accordance with apparatus specifications, and a band-shaped belt component is manufactured. Meanwhile, the traveling unit 6 is provided with a belt fixing means 20 for fixing the belt end portions as shown in FIG. 4 (bottom view of the carriage). The belt fixing means 20 is comprised of first and second engagement portions 21a, 21b provided in the carriage frame 15, first and second mount surfaces 22a, 22b similarly provided in the carriage frame 15, a concave recess portion 23 provided between the first and second engagement portions 21a, 21b, and a lock fixing member 24 that is fitted into the concave recess portion. In addition, one end edge portion 18x and the other end edge portion 18y of the driving belt 18 are of the same structure, and fixed to the carriage frame 15.

Then, the engagement portions 21 (first engagement portion 21a, second engagement portion 21b; the same in the following) are configured to engage in belt end edge portions 18Z (one end edge portion 18x, the other end edge portion 18y; the same in the following) to lock in the length direction (sub-scanning direction; X direction in FIG. 1). In the apparatus as shown in the figure, slit grooves in the shape of a C in cross section as shown in FIG. 4 are provided in the carriage frame 15, and the belt end edge portions 18Z are inserted inside the grooves. In other words, the slit grooves having opposite surfaces adapted to the belt thickness d constitute the first and second engagement portions 21a, 21b, and it is configured that the belt end edge portions 18 are inserted inside the grooves.

Figure 5A:
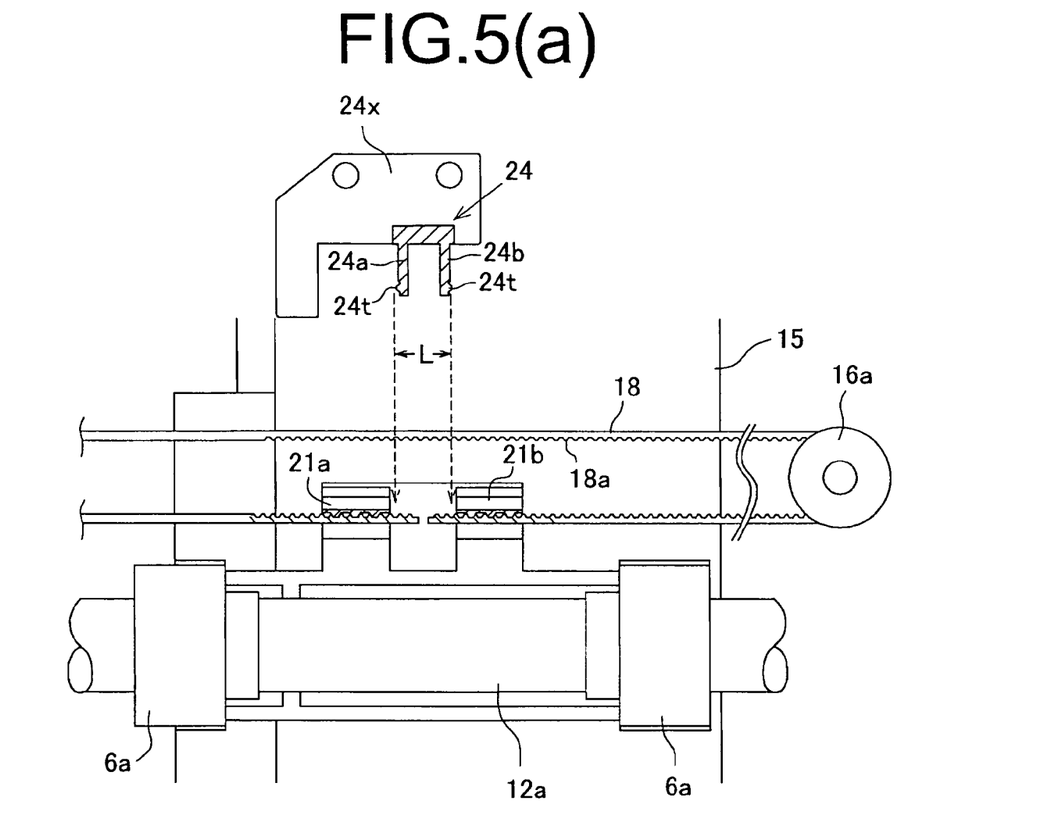
FIG. 5(a) shows the entire configuration.
Figure 5B:
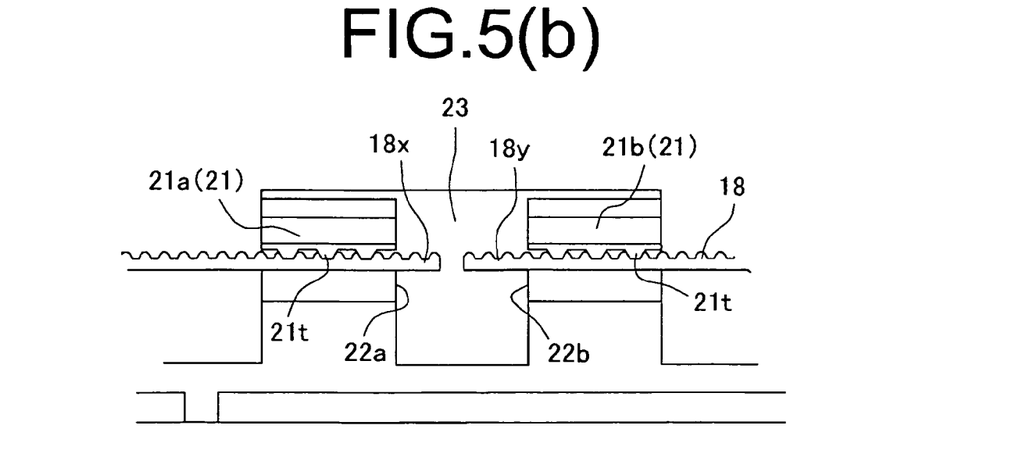
FIG. 5(b) is an explanatory view of principal part.

Then, one of the opposite surfaces constituting the slit groove is provided with protrusions 21t mated with the tooth forms 18a of the belt (see FIG. 5(b)). As the protrusions 21t shown in the figure, a plurality of protrusions 21t is provided to engage in a plurality of tooth forms 18a.

Accordingly, the belt 18 with ends and teeth is inserted in the engagement portions 21 while being fitted with a pair of pulleys 16a, 16b, and the tooth forms 18a are fitted into the protrusions 21t. By this means, it is possible to install the belt in between the pulleys with an appropriate length. In addition, the shape of the engagement portions 21 does not need to be always formed of a slit groove, and an engagement surface having protrusions 21t mated with the belt tooth forms 18a may simply be provided in the carriage frame 15.

The concave recess portion 23 is formed between the first and second engagement portions 21a, 21b. In the concave recess portion 23 are formed mount surfaces 22 to bend the belt end edge portions 18Z locked by the engagement portions 21, and concurrently therewith, the portion 23 is configured in the shape with which the lock fixing member 24 described later is fitted.

Figure 6A:
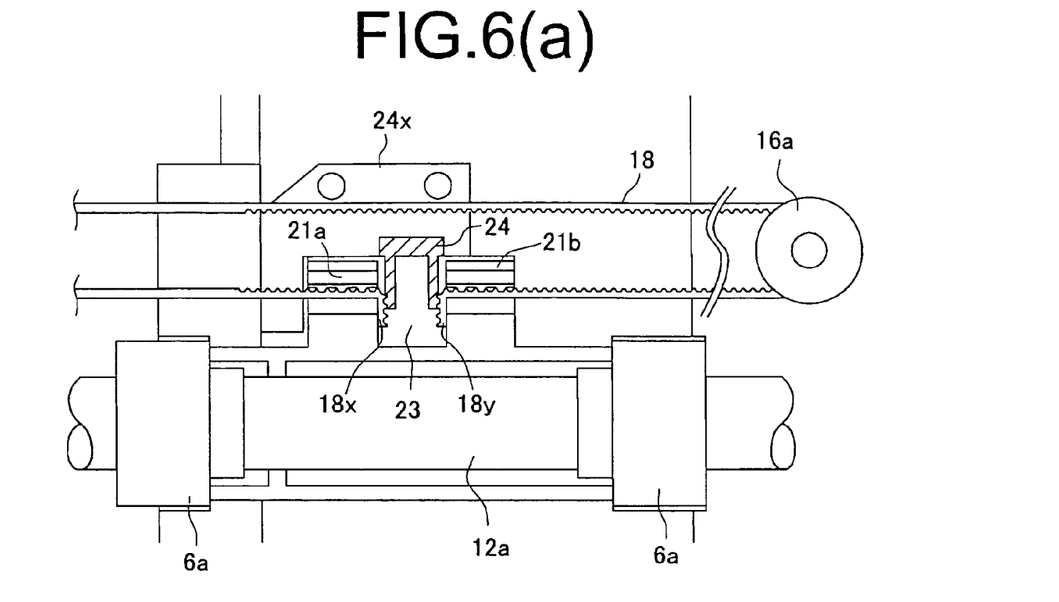
FIG. 6(a) shows the entire configuration.
Figure 6B:
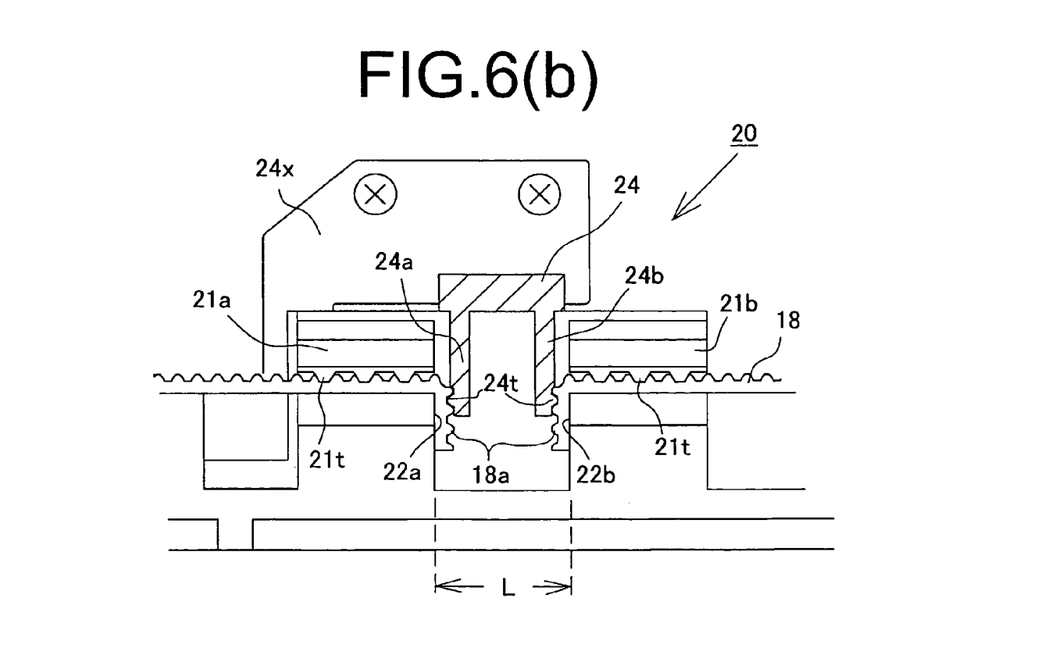
FIG. 6(b) is an explanatory view of principal part of FIG. 6(a)

In other words, as shown in FIGS. 6(a) and 6(b), the concave portion is formed with a distance L between the first engagement portion 21a and second engagement portion 21b. Then, the distance L is formed substantially in the same span as the distance of the lock fixing member 24 described later. The concave recess portion 23 is provided with corner portions 22x, the corner portions 22x are formed at a right angle, acute angler or obtuse angle, and the belt end edge portions 18Z are bent in accordance with the corner portions 22x.

Figure 7A:
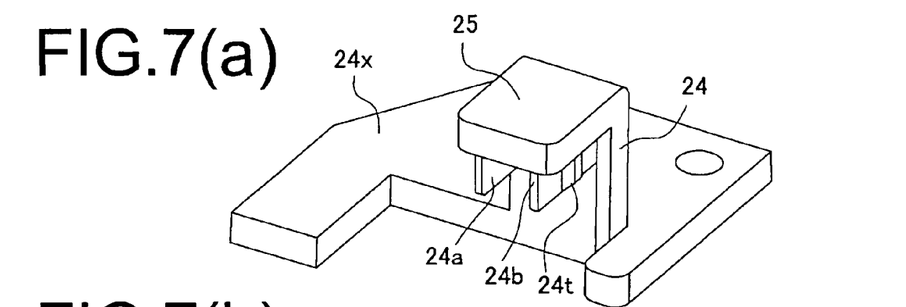
FIG. 7(a) is a perspective structural view.
Figure 7B:
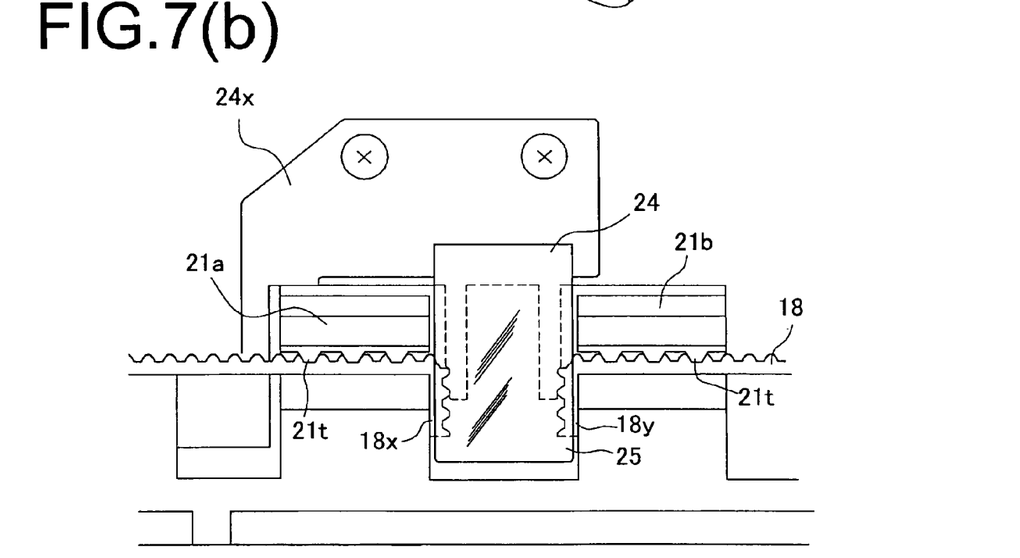
FIG. 7(b) is an explanatory view of a fixing state.
Figure 7C:
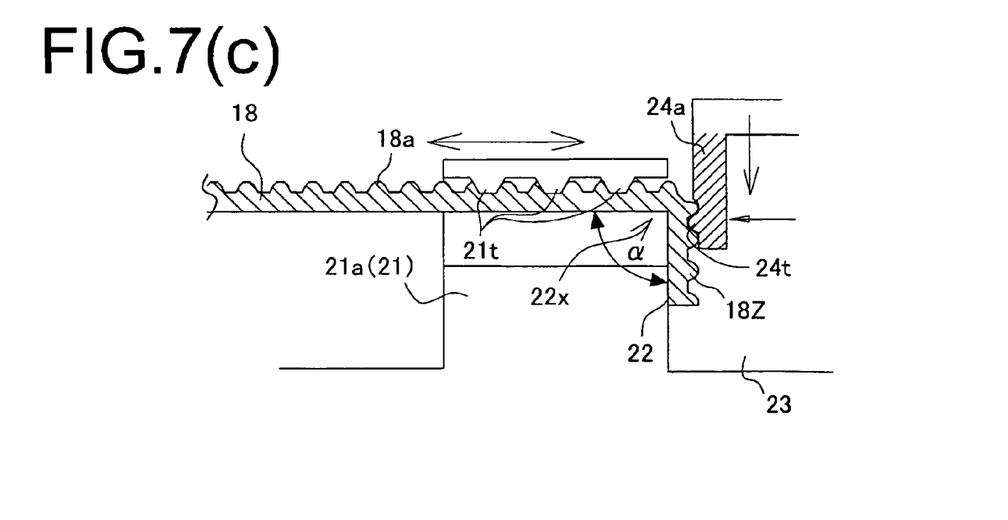
FIG. 7(c) is a detailed explanatory view of an engagement portion.

Accordingly, the angle α (see FIG. 7(c)) of the corner portion 22x is set corresponding to the material quality of the belt, particularly rigidity. For example, when the belt material is high in elasticity and tends to stretch, an acute angle is preferably set. On the other hand, when the belt material is high in rigidity and does not stretch easily, an obtuse angle is set. The angle as shown in the figure is set at a right angle.

In the corner portions 22x are formed mount surfaces 22 (first mount surface 22a, second mount surface 22b; the same in the following). In other words, bending blocks are provided on opposite sides of the concave recess portion 23, and each of the corner portions 22x is formed at an angle α. Then, it is configured that the belt end edge portions 18Z are bent along the mount surfaces 22 formed at an angle α.

The lock fixing member 24 is provided with first and second locking pieces 24a, 24b adapted to the distance L of the concave recess portion 23. Then, the member 24 is formed to be able to fit into the concave recess portion 23 so that the first locking piece 24a presses the belt end edge portion 18x against the first mount surface 22a, and that the second locking piece 24b presses the belt end edge portion 18y against the second mount surface 22b. The first and second locking pieces 24a, 24b are each provided with a protrusion 24t engaging in the tooth forms 18a of the driving belt.

Further, the lock fixing member 24 is integrally provided with a bracket 24x for fixing to the carriage frame 15 with the first and second locking pieces 24a, 24b fitted into the concave recess portion 23. The first and second locking pieces 24a, 24b shown in the figure are made of metal or resin having elasticity, and elasticity is applied in a direction for pressing the belt end edge portion 18z against the mount surface 22 side.

As shown in FIG. 7, thus formed lock fixing member 24 is provided with a cover member 25 to cover the concave recess portion 23, and covers the concave recess portion so that the belt end edge portions 18 secured by the first and second engagement pieces 24a, 24b do not protrude outward from the side.

[Action of the Belt Fixing Means]

The action of the belt fixing means 20 as described previously will be described. FIG. 5 shows a state where the belt 18 with ends and teeth is installed in the traveling unit (optical carriage) 6, and FIG. 6 shows a state where the opposite end edge portions 18x, 18y of the belt 18 with ends and teeth are fixed by the lock fixing member 24.

As described previously, the belt 18 with ends and teeth is manufactured in open belt form in the appropriate process. This belt is cut into a length conforming to the apparatus specifications. Then; the belt is wound over a pair of pulleys 16a, 16b disposed in the apparatus. In this state, the opposite end edge portions 18x, 18y of the belt are engaged in the first and second engagement portions 21a, 21b formed in the unit frame (carriage frame) 15 of the traveling unit 6.

In the aspect shown in the figure, the belt end edges are inserted in the slit grooves. At this point, the tooth forms 18a of the belt and the protrusions 21t of the engagement portions 21 are mated with each other. This state is shown in FIG. 5(a). In this state, as shown in FIG. 5(b), the length of the belt is adjusted so that the length-direction dimension (horizontal direction in FIG. 5(b)) and tension of the belt conform to the apparatus. With the dimension adjusted, the belt is locked in the protrusions 21t. Then, the belt end edge portions 18x, 18y are positioned in the recess concave portion 23 formed between the both engagement portions.

Next, the lock fixing member 24 is fitted into the recess concave portion 23. At this point, the fit is made so that the first and second locking pieces 24a, 24b of the lock fixing member 24 press the belt end edge portions 18x against the mount surfaces 22. Concurrently therewith, the protrusion 24t provided in each of the locking pieces 24a, 24b is mated with the belt tooth forms. This operation is made to fit using the elastic force of the locking pieces so that pressing of the belt and mating with the tooth forms are adequate states. Then, the bracket 24x is fixed to the unit frame 15 using a securing means such as a screw.

In the belt 18 with ends and teeth thus coupled to the unit frame 15 by the belt fixing means 20, first, with the belt inserted in the first and second engagement portions 21a, 21b, the length-direction dimension (length in the shift direction of the traveling unit) is adjusted. Accordingly, instead of producing the belt 18 with teeth in endless form individually using a manufacturing die, it is possible to collectively produce belts of similar types of apparatuses. Then, the thus-length-adjusted belt 18 with ends and teeth is reliably fixed at the end edge portions 18x, 18y by the lock fixing member 24.

In other words, the belt end edge portions 18x, 18y are bent by the corner portions 22x of the first and second mount surfaces 22a, 22b. As the belt bending, the belt is bent according to the angle α of an acute angle, right angle or obtuse angle corresponding to the belt material, and therefore, the fixed position of the belt is not displaced even when the driving force acts in the belt length direction. Further, the tooth forms 18a of the belt end edge portions 18x and 18y are mated with the protrusions 24t of the first and second locking pieces 24a, 24b, and the locking pieces 24a, 24b are secured to the unit frame 15 by the bracket 24x. Accordingly, even when an excessive driving load is imposed on the belt 18 with teeth, the belt end edge portions 18x, 18y neither become detached nor cause a position shift.

In addition, in the invention, the case is described that the lock fixing member 24 is secured to the unit frame 15 by a screw or the like, but for example, such a structure can naturally be adopted that a latch fringe (level difference) portion, latch pin or the like is provided in the unit frame 15, and that the lock fixing member fitted with the recess concave portion 23 is latched and locked in the frame. Further, the lock fixing member 24 may be integrally provided with the cover member 25, or may have an attachment structure that is formed of a body different from locking pieces and attached.

In the foregoing, the invention is described on the aspect that the belt with ends is fixed to the traveling unit, but the invention is not limited to the belt with ends, and is applicable to a belt (endless belt) without ends by fixing the couple end portion of the belt at two, first and second, fix portions, by the same belt fixing member as described above.

In addition, this application claims priority from Japanese Patent Application No. 2009-202771 incorporated herein by reference.

What is claimed is:

1. A traveling unit driving apparatus comprising:
   a traveling unit supported on an apparatus frame to be able to reciprocate;
   a driving belt for causing the traveling unit to reciprocate with a predetermined stroke;
   a pair of pulleys for supporting the driving belt along a traveling direction of the traveling unit;
   a driving device for driving one of the pair of pulleys to rotate; and
   a belt fixing device for locking the driving belt in the traveling unit,
   wherein the driving belt is comprised of a belt with ends and teeth having opposite end edges,
   the belt fixing device is comprised of a first engagement portion and a second engagement portion provided in the traveling unit, a concave recess portion formed between the first engagement portion and the second engagement portion, and a lock fixing member that is fitted into the concave recess portion,
   the first engagement portion and the concave recess portion are provided with a first mount surface for bending and supporting one end edge portion of the belt with teeth,
   the second engagement portion and the concave recess portion are provided with a second mount surface for bending and supporting the other end edge portion of the belt with teeth, the lock fixing member is fitted into the concave recess portion so as to sandwich and hold one end portion of the belt with teeth with the first mount surface, and further sandwich and hold the other end portion with the second mount surface with each end portion bent, and protrusions for engaging in a tooth surface of the belt with teeth are formed in each of the first engagement portion, the second engagement portion and the lock fixing member.

2. The traveling unit driving apparatus according to claim 1, wherein the first mount surface and the second mount surface are provided in first and second bending blocks provided in a frame member of the traveling unit, and the first and second mount surfaces are comprised of substantially orthogonal belt support surfaces.

3. The traveling unit driving apparatus according to claim 1, wherein each of the first engagement portion and the second engagement portion is comprised of a slit groove with which the end edge portion of the belt with teeth is fitted, and the slit groove is provided with at least one protrusion for engaging in the tooth surface of the belt with teeth.

4. The traveling unit driving apparatus according to claim 1, wherein the lock fixing member is attached detachably to the concave recess portion of the traveling unit, and has elasticity in directions to press the end edge portions of the belt with teeth against the first mount surface and the second mount surface.

5. The traveling unit driving apparatus according to claim 4, wherein the lock fixing member is provided with a cover member to cover opposite end edge portions of the belt with teeth held with the first and second mount surfaces, and the cover member is disposed in the concave recess portion.

6. The traveling unit driving apparatus according to claim 4, wherein the lock fixing member is attached detachably to the concave recess portion of the traveling unit, while being integrally fixed to a frame member of the traveling unit.

7. The traveling unit driving apparatus according to claim 1, wherein the lock fixing member is provided with a cover member to cover opposite end edge portions of the belt with teeth held with the first and second mount surfaces, and the cover member is disposed in the concave recess portion.

8. The traveling unit driving apparatus according to claim 1, wherein the lock fixing member is attached detachably to the concave recess portion of the traveling unit, while being integrally fixed to a frame member of the traveling unit.

9. A traveling unit driving apparatus comprising:

a traveling unit supported on an apparatus frame to be able to reciprocate;

a driving belt for causing the traveling unit to reciprocate with a predetermined stroke;

a pair of pulleys for supporting the driving belt along a traveling direction of the traveling unit;

a driving device for driving one of the pair of pulleys to rotate; and a belt fixing device for locking the driving belt in the traveling unit at two portions of first and second fix portions, wherein the belt fixing device is comprised of a first engagement portion and a second engagement portion provided in the traveling unit, a concave recess portion formed between the first engagement portion and the second engagement portion, and a lock fixing member that is fitted into the concave recess portion, the first engagement portion and the concave recess portion are provided with the first mount surface for bending and supporting the first fix portion of a belt with teeth, the second engagement portion and the concave recess portion are provided with the second mount surface for bending and supporting the second fix portion of the belt with teeth, the lock fixing member is fitted into the concave recess portion so as to sandwich and hold the first fix portion of the belt with teeth with the first mount surface, and further sandwich and hold the second fix portion with the second mount surface with each fix portion bent, and protrusions for engaging in a tooth surface of the belt with teeth are formed in each of the first engagement portion, the second engagement portion and the lock fixing member.

10. An image reading apparatus comprising:

an apparatus frame:

a reading platen disposed in the apparatus frame;

a traveling rail disposed in the apparatus frame along a scanning direction of the reading platen;

an optical carriage supported slidably on the traveling rail to emit reading light to an image on the reading platen;

an image reading device for performing photoelectric conversion on the reading light from the optical carriage;

a driving belt for causing the optical carriage to reciprocate along the traveling rail;

a pair of pulleys for supporting the driving belt along a traveling direction of the optical carriage; and a driving device for driving one of the pair of pulleys to rotate; and a belt fixing device for locking the driving belt in the optical carriage, wherein the driving belt is comprised of a belt with ends and teeth having opposite end edges, the belt fixing device is comprised of a first engagement portion and a second engagement portion provided in the optical carriage, a concave recess portion formed between the first engagement portion and the second engagement portion, and a lock fixing member that is fitted into the concave recess portion, the first engagement portion and the concave recess portion are provided with a first mount surface for bending and supporting one end edge portion of the belt with teeth, the second engagement portion and the concave recess portion are provided with a second mount surface for bending and supporting the other end edge portion of the belt with teeth, the lock fixing member is fitted into the concave recess portion so as to sandwich and hold one end portion of the belt with teeth with the first mount surface, and further sandwich and hold the other end portion with the second mount surface with each end portion bent, and protrusions for engaging in a tooth surface of the belt with teeth are formed in each of the first engagement portion, the second engagement portion and the lock fixing member.

* * * * *